(12) United States Patent
Figlewski

(10) Patent No.: US 12,619,089 B1
(45) Date of Patent: May 5, 2026

(54) RAINBOW PROJECTOR AND METHOD FOR PRODUCING RAINBOW LIGHT

(71) Applicant: Stephen Figlewski, Montclair, NJ (US)

(72) Inventor: Stephen Figlewski, Montclair, NJ (US)

( * ) Notice: Subject to any disclaimer, the term of this patent is extended or adjusted under 35 U.S.C. 154(b) by 0 days.

(21) Appl. No.: 18/923,645

(22) Filed: Oct. 22, 2024

Related U.S. Application Data

(60) Provisional application No. 63/595,333, filed on Nov. 1, 2023.

(51) Int. Cl.
*G02B 27/12* (2006.01)
*G02B 27/10* (2006.01)

(52) U.S. Cl.
CPC ....... *G02B 27/126* (2013.01); *G02B 27/1006* (2013.01); *G02B 27/1073* (2013.01)

(58) Field of Classification Search
CPC .............. G02B 27/126; G02B 27/1006; G02B 27/1073
USPC ........................................................ 359/640
See application file for complete search history.

(56) References Cited

U.S. PATENT DOCUMENTS

| | | | | |
|---|---|---|---|---|
| 2004/0240089 A1* | 12/2004 | Nagy | ........................ | G02B 5/06 |
| | | | | 359/834 |
| 2010/0195227 A1* | 8/2010 | Green | ..................... | F24S 50/20 |
| | | | | 359/872 |

FOREIGN PATENT DOCUMENTS

| | | | | |
|---|---|---|---|---|
| EP | 0216562 A2 * | 4/1987 | .............. | F24S 23/31 |

* cited by examiner

*Primary Examiner* — Bumsuk Won
*Assistant Examiner* — Mitchell T Oestreich
(74) *Attorney, Agent, or Firm* — Law Offices Of Mitchell P. Novick

(57) ABSTRACT

An embodiment of this invention regards the production and projection of rainbow colors from sunlight or an alternative light source, and more particularly, the production and projection of a multicolored rainbow patch of light onto a chosen target, such as a ceiling or wall, an object, or any other target. A prism receives a lightstream either directly or by reflection from a mirror. The lightstream enters the prism at a specific angle and is refracted, emerging as a rainbow light. The rainbow light is directed towards the chosen target either directly from the prism or by reflection from a mirror.

17 Claims, 6 Drawing Sheets

Fig. 6

RAINBOW PROJECTOR AND METHOD FOR PRODUCING RAINBOW LIGHT

CROSS-REFERENCES TO RELATED APPLICATIONS

This application claims the benefit of U.S. Provisional Application For Patent Ser. No. 63/595,333, filed Nov. 1, 2023; and whose contents are incorporated by reference herein in their entirety.

FIELD OF THE INVENTION

This invention regards the production and projection of rainbow colors from sunlight or an alternative light source, and more particularly, the production and projection of a multicolored rainbow spot or patch of light onto a desired target, such as a wall, an object, or any other target.

BACKGROUND OF THE INVENTION

Throughout history, rainbows have produced wonder and fascination, as well as scientific inquiry. Rainbows are invariably regarded in a positive way. In the Bible, the rainbow is God's sign that the Great Flood is over. Rainbows in folklore are lucky and lead to pots of gold. Today, rainbow colors and imagery are everywhere: in clothing, home decorations, toys, tattoos, business logos, and much more.

Natural rainbows are formed when sunlight passes through water droplets in the atmosphere. The droplets act as prisms, and a visual rainbow is created in the sky. Sunlight passing through a man-made prism also refracts into rainbow colors and the image can be projected onto a surface or a screen for viewing.

"White" light from the Sun is a mixture of all the colors in the visible light spectrum. Rainbow images are frequently produced using a prism made of glass, acrylic plastic, or another transparent material. When light passes through the prism the different colors are refracted (bent) by differing amounts, to emerge as visually distinct rays of pure color. The prism produces a spot or patch of light displaying "every color of the rainbow." An example of a patch of rainbow light is shown in FIG. 1.

In the prior art, there are various devices and techniques that produce rainbow colors from natural sunlight.

Typical prior art is disclosed in Mori, "Rainbow Forming Device," U.S. Pat. No. 4,955,975 issued on Sep. 11, 1990. Mori discloses "[a] rainbow forming device includes a light guide for transmitting visible light therethrough and a prism having a cross-section of a substantially equilateral triangle for splitting the light into a series of colors of the spectrum to form a rainbow. A light-emitting end of the light guide is set with its axis perpendicular to the prism's first edge. The visible light emitted from the light guide's end passes through the prism along the path from prism's first vertex including the prism's first edge to said prism's second vertex and the light split into colors of the spectrum are emitted from the prism's third vertex and forms a rainbow." Mori is a relatively basic, and not very efficient, setup for splitting visible light into rainbow colors.

In Dear, "Rotating spectral display device," U.S. Pat. No. 9,013,775, issued on Apr. 21, 2015, "[a] solar powered rainbow-making device produces a visual display that is created by the interplay of light and a light refractive element that form constantly changing patterns from a rotating crystal. The rotating display device includes a circular-shaped refractive element that is mounted on a base and is turned by a motor driven transmission gear train. The crystal rotates about a horizontal axis as sunlight is transformed into a color spectrum that moves in a circular fashion. The color images can include a plurality of distinct rainbow images that are projected onto the walls and other structures in the immediate environment." Dear does not allow significant control over the created rainbow image.

Arai, "Rainbow projector," U.S. Pat. No. 4,557,055, issued on Dec. 10, 1985, discloses another approach to rainbow image creation. "The present invention relates to a rainbow image projector adapted to project a vivid rainbow image from a relatively small light source onto walls of a stage, a store, places for various parties, and like. Specifically, light rays emitted from the linear incandescent light source are converted by a cylindrical condenser lens into parallel light rays which are, in turn, obliquely incident on a triangular prism over whole area of its first refraction plane. Thus, it is possible to project a vivid rainbow image of a large curvature radius from the small light source of small power consumption and heat generation." Arai is really a visual amplifier and a relatively complex method of creating a rainbow image from a different light source than the Sun.

Another rainbow-creating approach is disclosed in Cabrera, "Installation for artificial rainbow generation and observation of same," U.S. Patent Publication No. 2005/0024892, filed Nov. 21, 2002. In Cabrera, sunlight passes through a water curtain composed of water droplets. The water droplets act as a group of prisms, and the sunlight emerges from the water curtain in a multi-color, rainbow-like formation.

Further, there are also numerous devices available in the marketplace which employ a transparent flat sheet through which visible light may pass, whereby the output is a rainbow-like image. The flat sheet may be of a Fresnel lens configuration or made of a material which acts as a prism.

In addition, there are numerous devices available in the marketplace which employ a transparent crystal or other gem-like shape through which visible light may pass, whereby the output is a rainbow-like image. In practice, the crystal acts similarly to a prism.

These and other prior art devices and techniques suffer from several shortcomings. First, prior art devices and techniques do not produce a patch of rainbow color of substantial size. Second, they do not direct the lightstream in any chosen direction toward a target of the user's choosing. Third, during daylight hours the Sun is constantly moving in the sky and prior art devices and techniques do a poor, or no, job of tracking its path. Consequently, they are unable to produce a consistent rainbow image from the Sun that remains focused on a target.

Thus, it is desirable to have a device and/or technique which overcomes these shortcomings.

BRIEF SUMMARY OF THE INVENTION

One object of this invention is a rainbow projector that produces a consistent patch of full spectrum light on a surface or target, such as a ceiling or wall or an object.

A second object of this invention is a rainbow projector than produces a patch of full spectrum light that can be focused on a target of the user's choosing.

A further object of this invention is a rainbow projector that produces a consistent rainbow patch that remains in the same location over multiple daylight hours.

Still another object of this invention is a rainbow projector that can track the path of the Sun as its position in the sky changes during the day, and as it varies seasonally over longer periods.

A further object of this invention is a rainbow projector that allows different colors in the rainbow lightstream to be directed toward different targets.

One more object of this invention is a rainbow projector that uses an artificial light source in place of natural sunlight in order to accomplish any or all of the previously described objects.

In short, an embodiment of this invention captures white light and passes it through a prism to produce a patch of "full spectrum rainbow light" that can be projected onto a target. The light source is normally natural sunlight, but an artificial light source may be used to substitute for sunlight.

Embodiments of this invention use of one or more mirrors to direct a stream of light into a prism at the correct angle to produce a refracted (rainbow) lightstream, that can be directed toward a target of the user's choosing.

Embodiments include two basic designs using a prism and a single mirror, and a two-mirror version. A wide variety of implementations using this basic approach can be envisioned.

BRIEF DESCRIPTION OF THE SEVERAL VIEWS OF THE DRAWING

FIG. 1 illustrates a patch of rainbow light produced by the invention and projected onto a ceiling.

Figure 6:
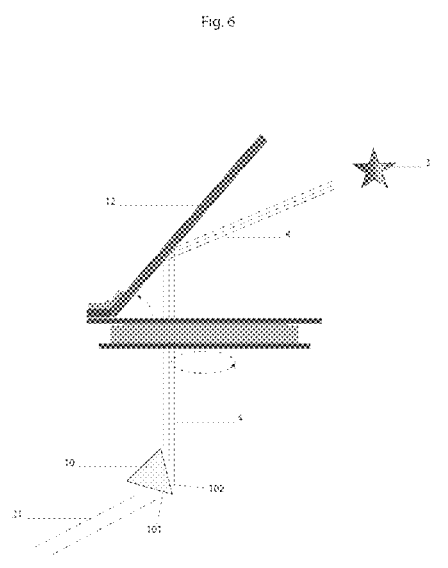

FIG. 6 is a schematic representation of a side-view of the aimer unit for the two-mirror design shown in FIG. 5, that illustrates how the refracted lightstream from the prism is aimed at the target.

DETAILED DESCRIPTION OF THE INVENTION

Figure 3:
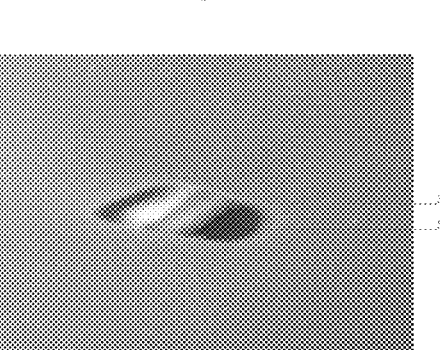
FIG. 3 is a schematic representation of the lightstream through an embodiment of the invention with a single "Sun mirror". This figure shows how the projector hits its target with the sun in two different positions.

Snell's Law describes how white light is refracted when it passes between the air and the glass as it enters or exits from a prism.

Snell's Law: $R_i \times \sin(A_i) = R_r \times \sin(A_r)$, where $A_i$ is the angle of an incoming light ray and $A_r$ is the angle of the refracted light ray. $R_i$ and $R_r$ are the refractive indexes of the material the incoming ray is leaving and the material it is entering. The refractive index of air is 1.0 and for a glass or acrylic prism $R_r$ is between about 1.45 and 1.55, depending on the color of the light.

The amount of refraction and whether light enters the prism at all depends on the angle $A_i$ at which it hits the entry (first) face. The angles in Snell's Law, $A_i$ and $A_r$, are by convention expressed relative to the normal vector, which is perpendicular to the surface. Thus, light entering the prism face straight, at an angle of 90° relative to the face, is at an angle $A_i=0$ relative to the normal. Since $\sin(0)=0$, a light ray at this angle will not refract at all when it enters the prism. Light coming in at an angle $A_i>0$ does refract in the prism, with violet light bent more and red light less. Because of the shape of the prism, the light is refracted again in the same direction when it emerges from the exit (second) face, increasing the spread between red and violet. However, if $A_i$ is too close to zero, when the light ray hits the exit face refraction would be at such a large angle that it does not escape at all, but reflects back into the prism instead.

Common prisms are made from crown glass or acrylic. For a crown glass or acrylic prism, the maximum spread between red and violet for which the full visible spectrum emerges from the exit face, i.e., the critical value for $A_i$ in the invention, is about 30°. In the implementations described here, I set $A_i=32°$ to be sure the deep violet light gets through the prism 10.

In passing through such prisms 10, red light is bent about 46° relative to its initial angle, and violet about 51°, with most of the spectrum emerging at a deviation of around 48° relative to its initial direction. In embodiments of the present invention, the prism 10 is positioned so that the rainbow light 4 emerges from the exit face 102 toward the aimer mirror in the vertical direction, 90° relative to horizontal. This means the entering lightstream 21 is preferably at 42° relative to the horizontal.

Figure 2:
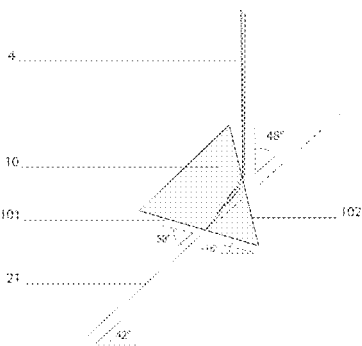
FIG. 2 is a schematic representation of how light rays are refracted in the prism and displays the angles that cause the output rays to emerge in the vertical direction.
Figure 3:
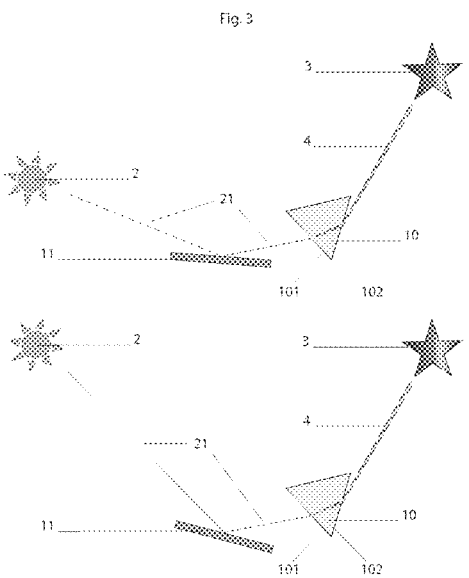

FIG. 2 illustrates a lightstream 21 that is aimed toward the entry face 101 of the prism 10 at an angle of 42° relative to the horizontal. The prism 10 is positioned with its entry face 101 at −16° relative to horizontal, so the lightstream 21 strikes the prism 10 at the preferred angle of incidence of 32° relative to the entry face 101 (the preferred angle relative to the entry face 101 is 58°, see FIG. 2), the lightstream 21 is refracted both on entry and on exit, and rainbow light 4 is projected from the exit face 102 in the vertical direction.

A minimal configuration needed to create rainbow light 4 and project it onto a target 3 is a prism 10 with a single mirror. In this application, a mirror whose purpose is to direct light toward the prism 10 will be referred to as a "sun mirror" 11. A mirror that directs the rainbow light emerging from the prism 10 toward a target 3 is called an "aimer mirror" 12. The single mirror is either a sun mirror 11 or an aimer mirror 12. FIG. 3 shows the path of the lightstream 21 through an embodiment comprising a prism 10 and a sun mirror 11. The prism 10 is positioned in a relation to the target 3 so that the rainbow light 4 emerging from the exit face 102 is directed at the target 3.

The Sun 2 may be at any elevation from 0° to 90° to the horizontal; FIG. 3 shows the Sun 2 in two positions. The angle of the sun mirror 11 is adjusted so that the incoming lightstream 21 reflects toward the prism 10 to hit the entry face 101 at the preferred 32° relative to the face 101.

Figure 4:
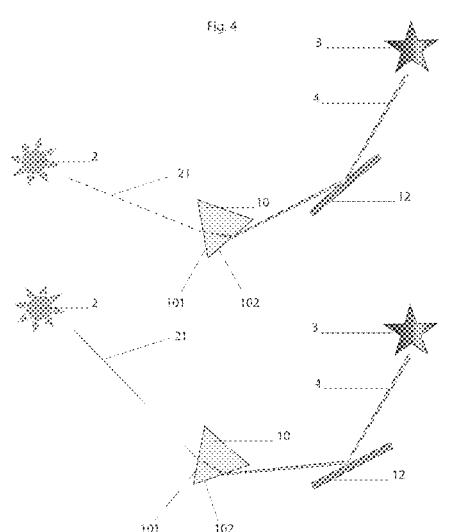
FIG. 4 is a schematic representation of the path of the lightstream through an implementation of the invention using a single "aimer mirror". This figure shows how the projector hits its target with the Sun in different positions by adjusting both the prism and the aimer mirror.
Figure 5:
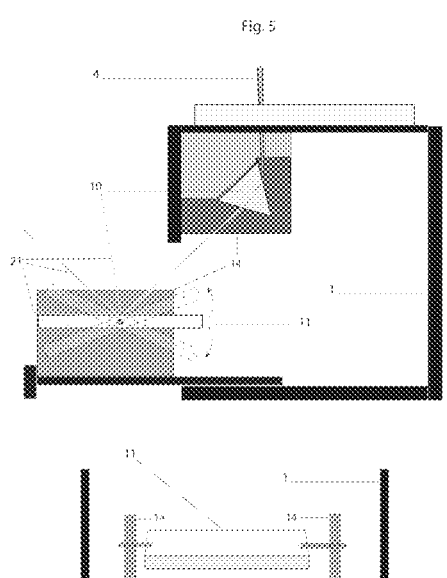
FIG. 5 is a schematic representation of two views of the sun mirror and prism assembly for an embodiment of the invention that uses both a sun mirror and an aimer mirror.

FIG. 4 illustrates the path of the lightstream 21 through an embodiment comprising a prism 10 and an aimer mirror 12. In this embodiment, the prism 10 itself is tilted for different elevations of the Sun in order to maintain the required angle of incidence relative to the prism face 101. The direction of the emerging rainbow light 4 changes with the prism's tilt so the aimer mirror 12 must also be adjusted to keep the rainbow light 4 focused on the target 3.

Both of these single-mirror embodiments can hit the target 3 with the Sun 2 at higher or lower elevation. But because the prism 10 is normally oriented with its long axis perpendicular to the incoming lightstream 21, these single-mirror embodiments of the invention have restricted ability to track a lateral change in the direction of the incoming lightstream 21, as the sun 2 moves from east to west during the day. This limitation can be eliminated by adding a second mirror.

A typical two-mirror embodiment of this invention comprises a projector 1 with a prism 10 positioned optimally between two mirrors. For concreteness, the description below comprises a simple embodiment with a single flat sun mirror 11 and a single flat aimer mirror 12, but other embodiments may use more than one of either type of mirror 11, 12, and any of the mirrors 11, 12 may be curved to achieve more precise control over the lightstream 21.

In this embodiment, to control the direction of the lightstream 21 through the projector 1 and toward the target 3, the mirrors 11, 12 must remain in the proper orientation with respect to the prism 10. Preferably, the mirrors 11, 12 are held in their desired orientation and location by a stable frame 14. The prism 10 is attached to a first portion of the stable frame 14. The Sun mirror 11 adjusts for the position of the Sun 2 in order to direct sunlight 21 into the prism 10 at the preferred angle of incidence. The Sun mirror 11 is held by a second portion of the frame 14 set in the proper location to produce this desired angle. The aimer mirror 12 is adjusted to project the rainbow light 4 emerging from the prism 10 toward the desired target 3. Adjustments of these elements within the frame 14 are preferably accomplished by rotating the mirrors 11, 12 in one or more directions.

Also, in this embodiment, the various portions of the frame 14 are preferably mounted in a rigid box (not shown) to maintain the desired relative location(s) and orientation(s).

Simple embodiments of the invention entail manual adjustment of the mirrors 11, 12. Other embodiments allow for automatic adjustment of one or more of the mirrors 11, 12. Such automatic adjustment may be accomplished by a motorized robotics mechanism (not shown) driven by an onboard microprocessor (not shown) or by some other internal or external control device. A prior art "pan-tilt" mounting used for a surveillance camera works well for this purpose.

The prism 10 is usually set in a fixed orientation relative to the Sun mirror 11, however, in some embodiments the location of the prism 10 may be adjustable by repositioning or rotation relative to the frame 14. As discussed above, the prism 10 and Sun mirror 11 are held in this desired relative orientation by their attachment to the frame 14. Regardless of how this orientation is accomplished, the key requirement is that lightstream 21 from the Sun mirror 11 can be aimed to enter the entry face 101 of the prism 10 at the preferred angle of incidence. In versions designed to track the Sun automatically, the prism 10 will normally rotate with the Sun mirror 11 in the horizontal plane (azimuth). Because the sun's 2 elevation varies over the course of a day, the angle of the Sun mirror 11 is preferably adjustable in the vertical direction (elevation).

In use, the rainbow projector 1 is typically placed on a windowsill or otherwise in the path of natural sunlight, which serves as the incoming lightstream 21. The sun mirror 11 is adjusted so that it captures the sunlight 21 and reflects it into the prism 10 at the preferred angle of incidence relative to the entry face 101, which is slightly more than 30°. The sunlight 21 then passes through the prism 10 and is refracted into full spectrum rainbow light 4 displaying stripes of pure color. This angle of incidence also avoids cutting off the deep violet color portion of the spectrum that is bent the most when passing through the prism 10. The aimer mirror 12 is adjusted to capture the rainbow light 4 and direct it toward the desired target 3, upon which it produces the rainbow patch 5.

The projected rainbow patch 5 may be large or small as desired. The exact size for any embodiment utilizing sunlight as the incoming lightstream 21 will depend upon several factors including, without limitation, the width and length of the prism 10, the distance and angle relative to the target 3 onto which the rainbow patch 5 is projected, and how clear the sky is (a hazy sky makes the patch 5 bigger). The rainbow patch 5 will normally be at least as wide as the prism's 10 length and can be several times longer than that length. For example, in one embodiment utilizing a prism 10 which is approximately three (3) inches long, the rainbow patch 5 (see FIG. 1) is roughly 3×8 inches.

An embodiment of the projector 1 uses a triangular prism 10 with three equal sides and angles of 60°. The prism 10 is preferably made of crown glass or acrylic. The prism 10 is set at an angle relative to the horizontal such that the rainbow light 4 emerges in a vertical direction, which facilitates proper aiming.

In this embodiment, a lightstream 21 enters the prism 10 from below, is refracted by about 48°, and emerges as a spectrum of rainbow light 4 in the vertical direction. Lightstream 21 is refracted when it enters the prism 10 and again when it exits, with the red light bent the least and violet bent the most. To make sure the deep violet light gets through and to allow a margin of error, the prism 10 in the current embodiment of the invention is set so that light from the Sun mirror 11 enters at an angle of incidence of approximately 32° relative to the entry face 101. For the exiting rainbow light 4 to emerge in the vertical direction, the entry face 101 of the prism 10 is set at an angle of −16° relative to horizontal. The Sun mirror 11 is therefore adjusted to reflect the rays from the Sun 2 into the prism 10 from below at an angle of 42° relative to horizontal.

In this embodiment of the invention, the Sun mirror 11 is adjusted manually to reflect the sunlight 21 toward the prism at a 42° angle relative to horizontal. The tilt of the Sun mirror 11 is preferably adjustable over a range between +21° (for sunlight 21 coming in horizontally) and −24° (for sunlight 21 that can be vertical at high noon).

Also in this embodiment, the aimer mirror 12 operates like a periscope. It swivels over a full 360 degrees and can be adjusted in the vertical dimension to raise or lower the rainbow light 4 on the target 3.

In summary, embodiments of this invention may be used to produce and project a patch of "full spectrum rainbow light" onto a desired target, surface, or object, and in any desired direction.

Although this invention has been described with a certain degree of particularity, it is to be understood that the present disclosure has been made only by way of illustration and that numerous changes in the details of construction and arrangement of parts may be resorted to without departing from the spirit and scope of the invention.

For example, two sun mirrors 11 may be utilized. One Sun mirror 11 is in a position with good Sun 2 exposure, which may be at a distance from the projector 1, and aims sunlight 21 toward the projector 1. A second Sun mirror 11 inside or close to the projector 1 would then point the rays 21 into the prism 10.

In another example, an embodiment may utilize multiple aimer mirrors 12 so that different colors of the rainbow light 4 are directed toward different targets 3.

Additionally, other potential variations are possible through the use of curved mirrors to give more ability to change the size and intensity of the rainbow patch 4.

Further, in some applications, one or more lenses (not shown) may be incorporated to further fine-tune the behavior of the lightstream 21.

I claim:

1. A rainbow projector comprising:

a prism having an entry face and an exit face not parallel to the entry face, the prism being without substantially reflective surfaces along a path from the entry face to the exit face;

receiving means to receive a lightstream at the entry face at an angle of incidence;

an aimer mirror having an aimer light reflecting surface, the aimer mirror not attached to the prism;

the prism allowing the lightstream to pass through the prism along the path and the lightstream being dispersed at the entry face and at the exit face to form a rainbow light;

transmittal means to transmit the rainbow light from the exit face to the aimer mirror; and aimer adjustment means positioning the aimer mirror such that the aimer light reflecting surface is positionable to receive the rainbow light and reflect the rainbow light in a desired manner.

2. The rainbow projector as described in claim 1, wherein the angle of incidence is more than 30 degrees.

3. The rainbow projector as described in claim 1, further comprising:

a source mirror having a source light reflecting surface; and source adjustment means positioning the source mirror such that the source light reflecting surface is positionable to receive the lightstream and reflect the lightstream to the entry face at the angle of incidence.

4. The rainbow projector as described in claim 3, wherein the angle of incidence is more than 30 degrees.

5. The rainbow projector as described in claim 3, wherein the lightstream is visible light from the Sun and the rainbow projector further comprises tracking means to track and remain aligned with the Sun during a period of time.

6. A rainbow projector system comprising:

a light source emitting a lightstream;

a source mirror having a source light reflecting surface;

a prism having an entry face and an exit face not parallel to the entry face, the prism being without substantially reflective surfaces along a path from the entry face to the exit face;

an aimer mirror having an aimer light reflecting surface, the aimer mirror not attached to the prism;

source adjustment means positioning the source mirror such that the source light reflecting surface is positionable to receive the lightstream and reflect the lightstream to the entry face at an angle of incidence;

the prism allowing the lightstream to pass through the prism along the path and the lightstream being dispersed at the entry face and at the exit face to form a rainbow light;

transmittal means to transmit the rainbow light from the exit face to the aimer mirror; and aimer adjustment means positioning the aimer mirror such that the aimer light reflecting surface is positionable to receive the rainbow light and reflect the rainbow light to a target;

the target being able to display the rainbow light as a rainbow patch.

7. The rainbow projector system as described in claim 6, wherein the angle of incidence is more than 30 degrees.

8. The rainbow projector system as described in claim 6, wherein the light source is the Sun, the lightstream is visible light from the Sun, and the rainbow projector system further comprises tracking means to track and remain aligned with the Sun during a period of time.

9. A method for producing a rainbow light, the method comprising:

obtaining a lightstream;

receiving the lightstream at an entry face of a prism having an entry face and the exit face not parallel to the entry face, at an angle of incidence, the prism being without substantially reflective surfaces along a path from the entry face to the exit face;

passing the lightstream through the prism from the entry face to the exit face, and the lightstream being dispersed at the entry face and at the exit face to form a rainbow light;

transmitting the rainbow light to an aimer mirror having an aimer light reflecting surface to receive the rainbow light, the aimer mirror not attached to the prism; and reflecting the rainbow light from the aimer light reflecting surface in a desired manner.

10. The method as described in claim 9, wherein the angle of incidence is more than 30 degrees.

11. The method as described in claim 9, wherein the receiving step further comprises:

positioning a source mirror having a source light reflecting surface to receive the lightstream; and reflecting the lightstream from the source light reflecting surface to the entry face, at the angle of incidence.

12. The method as described in claim 11, wherein the angle of incidence is more than 30 degrees.

13. The method as described in claim 11, wherein the lightstream is visible light from the Sun and the receiving means further comprises tracking means to track and remain aligned with the Sun during a period of time.

14. The method as described in claim 11, wherein the desired manner comprises:

reflecting the rainbow light from the aimer light reflecting surface to a target; and displaying the rainbow light on the target as a rainbow patch.

15. The rainbow projector as described in claim 1, wherein the aimer light reflective surface further comprises means to reflect the rainbow light to a target.

16. The rainbow projector as described in claim 1, wherein the rainbow light has an angular dispersion of at least four (4) degrees between a visible red wavelength and a visible violet wavelength.

17. The method as described in claim 9, wherein the rainbow light has an angular dispersion of at least four (4) degrees between a visible red wavelength and a visible violet wavelength.

* * * * *